United States Patent [19]

Fuller, Jr.

[11] 4,038,666
[45] July 26, 1977

[54] PORTABLE MEDICAL DATA RECORDER

[75] Inventor: Henry Edward Fuller, Jr., Stow, Mass.

[73] Assignee: American Optical Corporation, Southbridge, Mass.

[21] Appl. No.: 636,005

[22] Filed: Nov. 28, 1975

[51] Int. Cl.² .................... G01D 15/24; G01D 9/00; H02K 7/00
[52] U.S. Cl. ............................ 346/136; 346/33 ME; 310/67 R
[58] Field of Search ......................... 346/33 ME, 136; 310/67 R, 219

[56] References Cited

U.S. PATENT DOCUMENTS

| 2,532,271 | 11/1950 | Finch | 310/67 R X |
| 2,989,357 | 6/1961 | Verrett et al. | 346/33 ME |
| 2,997,608 | 8/1961 | Musser | 310/67 R |
| 3,056,054 | 9/1962 | Christian | 310/67 R X |
| 3,341,726 | 9/1967 | Brinster et al. | 310/219 X |
| 3,754,279 | 8/1973 | Valenti et al. | 346/76 R |

Primary Examiner—George H. Miller, Jr.
Attorney, Agent, or Firm—Albert H. Graddis; Jeremiah J. Duggan

[57] ABSTRACT

A portable medical data strip chart recorder in which a drive roller for drawing the strip across a platen includes integral motive means for rotating the roller at a selected angular velocity. A D.C. motor is mounted internally and concentrically with the roller shaft which upon energization drives the roller and hence the strip paper at a desired linear velocity. The incorporation of a D.C. motor internally of the drive shaft permits reduction in size and weight of the recorder as well as achieving a more efficient drive power transmission.

5 Claims, 3 Drawing Figures

PORTABLE MEDICAL DATA RECORDER

The present invention relates to a strip chart recorder and more particularly to a portable medical data recorder.

When monitoring a patient's vital functions it is frequently necessary and more often convenient to bring monitoring equipment to the patient rather than the patient to the equipment. This is most evident when testing an individual at other than a hospital installation or physician's office and during emergencies.

To best serve the above purpose, it is essential that portable equipment be of the smallest size and lowest weight compatible with functional requirements and constraints. Prior art portable strip chart recorders are both physically cumbersome and of excessive weight. Hence, any improvements in regard to these factors are of importance to the medical community.

In portable recorders now being marketed a strip of chart paper is pulled from a supply roller across a platen by a drive roller. Motion is imparted to the drive roller by a direct current motor through a gear train selected to achieve a desired strip velocity and tension.

The present invention comtemplates an improved portable medical data strip chart recorder. In accordance therewith a strip chart, furnished from a supply roller, is drawn by a drive roller means across the platen at a selected linear velocity. The drive roller means incorporates an integral motive means which imparts a predetermined angular velocity thereto.

The integral motor means includes D. C. motor means which is affixed internally and concentrically of a hollow shaft in the drive roller means. An axially aligned gear box is included in the D. C. motor means which when operatively associated with a D. C. motor causes the roller to rotate at the selected angular velocity. Thus, the prior art separate drive roller, gear train and motor combination replaced by an integral motor and gear box thereby permitting reduction in size and weight of the medical data recorder.

It is therefore an object of this invention to provide an improved portable strip chart recorder.

Another object is to provide a recorder of more compact design and enhanced portability.

Another object is to provide a recorder capable of being energized from a direct current source. Still another object is to provide a recorder having an integral drive mechanism.

These and other objects and features of the present invention will become clear upon review of the ensuing description accompanied by the drawings.

BRIEF DESCRIPTION OF THE DRAWINGS

Standard symbols and nomenclature are used throughout the drawings and like numbers indicate the same part in the different views. The drawings are intended as illustrative of the invention and are not intended to be delimiting of its scope.

DESCRIPTION OF THE PREFERRED EMBODIMENT

Figure 1:
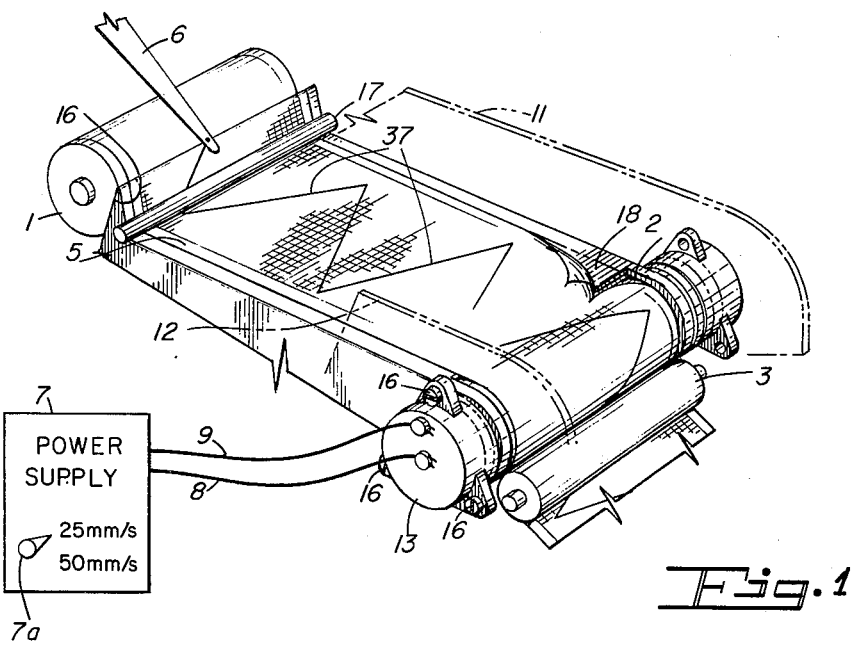
FIG. 1 is a partial perspective view of a portable strip chart recorder incorporating the subject invention.

Referring to FIG. 1 strip chart paper 5 is drawn from supply roller 1 over the apex of knife edge member 16, and passing under bar 17 and across platen 18. Drive roller 2 with pressure roller 3 captures paper 5 transmitting a controlled torque and velocity thereto.

Galvanometric stylus 6, responsive to body signals, produces analog indicia 37 on paper 5 as it passes over knife edge 16. Frame members 11 and 12 extending linearly along and parallel to the margins of platen 18 act to support platen 18 as well as bearings for supply roller 1, drive roller 2 and friction roller 3. Frame members 11 and 12 are also connected to the main frame of the recorder providing a structural base for numerous other mechanical elements and features of the recorder.

Figure 2:
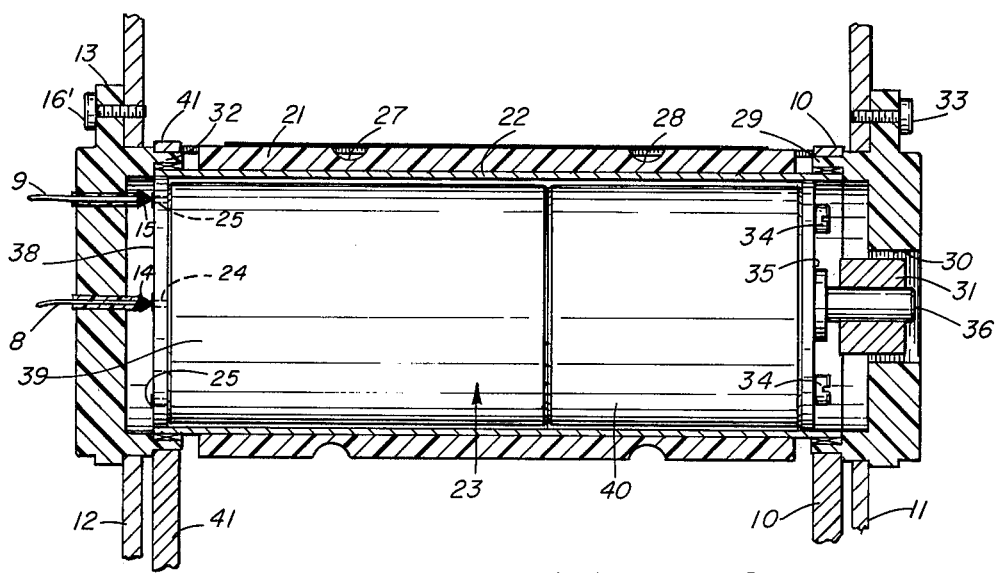
FIG. 2 is a cross-sectional view of the drive roller mechanism of the strip chart recorder of FIG. 1.
Figure 3:
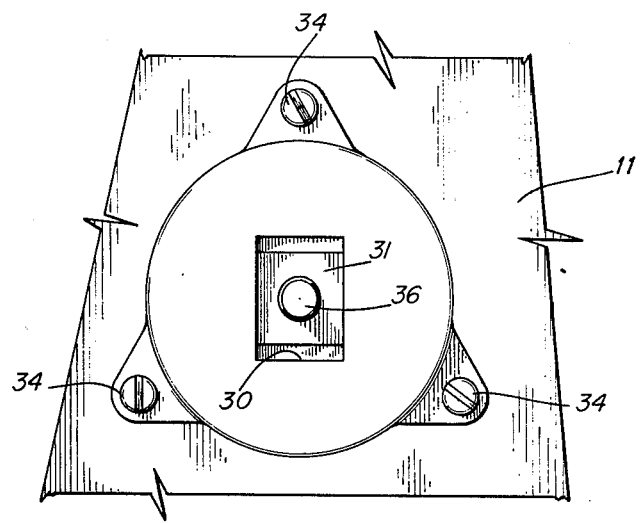
FIG. 3 is a detail plan view of a portion of the drive roller mechanism.

With reference to FIG. 2, drive roller 2 is seen to have an external cylindrical pad 21 made of resilient material having a suitable durometer. Pad 21 having circumferential slots 27 and 28 axially displaced about its periphery is preferably made of a urethane polymer of durometer 50 although any durometer between 45 and 65 is acceptable. The durometer of the material may of course be varied depending on the coefficient of friction of the material from which pad 21 is made and paper 5 in addition to the level of torque which must be developed.

Pad 21 has an outer diameter of approximately 1.564 inches and is concentricaly affixed to a hollow ground shaft 22. Pad 21 may as in the instant embodiment be molded to shaft 22 or affixed in any suitable manner. The marginal extremes of shaft 22 rotate in axially aligned bearings 29 and 32. Bearing 29 and 32 fabricated from a self-lubricating polymer or other suitable low friction material are mounted to and passed through suitable clearance holes in frame walls 11 and 12 respectively. The distal ends of the bearings in which shaft 22 rotates fit through and register with holes in bearing support members 41 and 10 respectively. Bearing 32 is attached to wall 12 by means of three screws 16 passing through clearance holes in bearing flange 13. Clearance is provided for matching screw 16 so as to permit alignment with bearing 29 mounted on opposite frame member 11. Bearing 29 is mounted in a similar manner by means of screws 33. The load forces transmitted to bearing 29 and 32 are relatively low being occasioned only by the forces necessary to the transport of paper 5 across platen 18.

Drive force is provided by direct current motor means 23 which is mounted concentrically with and internally of shaft 22. Motor means 23 comprises an assembly of direct current motor 39 integrally incorporating a gear box 40 to produce a predetermined angular velocity. Normally motor means 23 is utilized by fixing its housing and allowing the motor to rotate, however, in accordance with this invention the housing affixed to shaft 22 is allowed to rotate about the rotor shaft which is held stationery. Thus, the housing becomes the rotor and the rotor or output shaft of motor means 23 becomes the stator, thereby imparting angular rotation to shaft 22.

Shaft 22 is closed by wall 38 at its one end and wall 35 at its other. Motor means 23 is affixed to shaft 22 by three equispaced screws 34 passing through wall 35 and into complimentary threaded holes in gear head 40. Output shaft 36 of motor means 23 passes through a suitable clearance hole in wall 35 and thence into bearing member 29 wherein it is locked. Diametrical clearance between the outer diameter of motor means 23 and the inner diameter of shaft 22 is kept to a minimum so as to provide suitable support. Essentially however the torque developed by motor means 23 is taken up in shear by three mounting screws 34.

Coupling 31 is affixed to the distal end of motor means shaft 36. Coupling 31 may be affixed to shaft 36 by any suitable member such as a set screw or other locking device. Coupling 31 registers with a complimentary rectangular hole 30 in bearing member 29, and as shaft 36 attempts to turn it is prevented from doing so by bearing member 29.

A previously indicated, motor means 23 is energized by a direct current source, in the present embodiment power supply 7. Direct current is conducted through lines 8 and 9 into brush members 14 and 15 respectively. Brushes 15 and 14 register with an annular conductive ring 25 and an axial rotated conductor 24 respectively on shaft wall 38. Both annular conductor 25 and axial conductor 24 feed through wall 38 and connect to wiring and commutator assemblies in D. C. motor 39. Upon appropriate application of voltage over lines 8 and 9, motor 39 is caused to rotate at a selected angular speed.

Switch 7A may be set to 25 mm/sec. which represents one level of voltage or to 50 mm/sec. which represents a second and higher level of voltage. Determination of angular speed of course depends on the operating parameters of D. C. motor 39 and the gear ratio provided by gear head 40. Power supply 7 may be energized by rechargeable direct current cells or from any other suitable source of direct current power. It is of course anticipated the cells will be selected to provide a sufficiently long life so as to complete all necessary tests.

During a normal sequence leads are connected to the patient under going test and body signal information is conducted to stylus 6 of the recorder. The recorder is allowed to operate at either a selected speed of 25 mm/sec. or 50 mm/sec. depending upon the setting of switch 7A. Chart paper 5 after being threaded between drive roller 2 and pressure roller 3 is pulled across platen 18 thereby producing indicia 37 in response to the body signals. Thus is provided a self-contained portable data recorder of minimal size and weight. The integral design of drive roller and motor not only permits reduction in and simplification of design but also reduces the electrical energy consumed. Elimination of ancillary gear passes as well as additional bearings associated therewith results in a more efficient design. Enhanced efficiency in the transmission of drive power produces a commensurate increased operating time between changes in the power source.

The foregoing description is intended as illustrative of the invention and those modifications obvious to one skilled in the art are intended to be within its scope.

I claim:

1. A portable medical data strip chart recorder comprising:
   a supply roller on which the strip chart is stored;
   a platen across which the strip is drawn at a predetermined linear velocity and tension; and
   drive roller means for drawing the strip across the platen including integral motive means for rotating the roller means at a selected angular velocity, the drive roller means including a hollow shaft about which is affixed a concentric cylinder pad member of selected durometer, DC motor means mounted internally and concentrically of the shaft and affixed thereto having a DC motor axially aligned with a gearbox of selected ratio for providing the selected angular velocity and wherein the DC motor stator is affixed to the drive shaft and the rotor held stationary thereby causing the shaft and stator to rotate about the rotor at the selected angular velocity, the recorder includes a frame member to which the rotor is affixed and bearing members mounted to the frame in which marginal ends of the shaft are mounted, and a DC power source energizes the DC motor through brush means contacting means on one of the bearing members.

2. Recorder of claim 1 wherein the pad material has a durometer between 45 and 60.

3. Recorder of claim 2 wherein the first and second bearing members may be laterally moved.

4. Recorder of claim 2 wherein the durometer is 50.

5. The recorder of claim 4 wherein the bearing members consist of a self-lubricating polymer.

* * * * *